2,863,854
Patented Dec. 9, 1958

2,863,854

REDUCING ACIDITY OF POLYESTERS BY TREATMENT WITH ALKYLENE CARBONATE

Christopher L. Wilson, Sloatsburg, N. Y., assignor to Hudson Foam Plastics Corporation No Drawing. Application December 7, 1954
Serial No. 473,745

5 Claims. (Cl. 260—75)

The present invention relates to a method of making improved polyester materials and, more particularly, to a method of lowering the acid numbers of these materials so as to make an improved product.

Polyesters are usually made by heating together a dibasic acid such as phthalic, terephthalic, succinic or maleic, etc., with a polyhydroxy compound such as ethylene glycol, a propylene glycol, glycerol, sorbitol, and the like. The reaction is continued until a product of the desired viscosity is obtained. Air-drying oils such as linseed oil may be incorporated in the polyester so that the product will harden on exposure to air. Unsaturated components, such as the diallyl ether of tartaric acid, may be used to give the product curing properties in the presence of peroxide catalysts. Maleic acid and related substances as components have an analogous property. It is characteristic of polyester materials that their molecules include both terminal hydroxyl and carboxyl groups, the former usually being predominant. For the purposes of this invention it is intended to include polyester materials in their widest sense. Some subgroups of these sometimes carry the name alkyd or glyptal. These classes frequently are air-drying or thermosetting. In the thermosetting category, free hydroxyl and carboxyl groups are necessary, usually as terminal portions of chain branches. The present invention provides a means of changing the ratio of carboxyl to hydroxyl groups.

Polyesters are of great importance in the manufacture of paints, enamels, foamed materials, polyurethanes, plasticizers, molded products and many other useful articles. In many of these applications the presence of carboxyl groups in too great a number in the polymer molecule is detrimental. For example, in coating compositions, free carboxyl groups tend to make the material water-sensitive and thus may lead to corrosion of metal surfaces covered with the compositions. In polyurethane preparations the presence of carboxyl groups leads to gas evolution and the formation of bubbles. Bubble formation is, of course, undesirable in most molded products and films.

An object of the present invention is to provide improved polyester materials in which carboxyl groups are either reduced in number or removed completely.

Another object of the invention is to provide improved polyester materials in which at least some of the carboxyl groups normally present are replaced with alkyl or hydroxyalkyl groups.

Another object of the invention is to provide polyester materials having lowered sensitivity to water.

Still another object of the invention is to provide polyester materials less subject to gas evolution on reaction with isocyanates.

Improved polyesters are made in accordance with the present invention by preferentially reducing in number or removing completely the carboxyl groups usually present in the polymer molecules, by heating the polyester materials with an organic carbonate in the presence, preferably, of an acidic or alkaline catalyst. The carboxyl groups which are removed are replaced by hydroxyalkyl groups. The invention is based on the present discovery that a carbonate, such as ethylene carbonate, for example, will react much more rapidly with the carboxyl groups than with the hydroxyl groups present in the polyester molecules.

In the practice of the invention, the polyester material is first made as usual by reacting together a dibasic organic acid and a glycol, along with any other desired component. The polyester may also be made by including, along with the dibasic acid and the glycol, an alkyl polyhydroxy compound having more than two hydroxy groups. A method of making a polyester material in this manner has been disclosed and claimed in a copending application of Christopher L. Wilson and Henry George Hammon, Serial No. 442,195, filed July 8, 1954. Polyesters of particular interest are those having molecular weights above 1000. As heretofore prepared, these materials have generally had acid numbers of more than 1.0. In the present invention it is possible to reduce the acid number to a value less than 1.0. The "acid number" (herein defined as the number of milligrams of potassium hydroxide necessary to neutralize one gm. of polyester) is determined, and from this is calculated the amount of carbonate necessary to reduce the carboxyl groups by the necessary amount. The calculated amount of carbonate is mixed with the polyester and the mixture is then heated, preferably with a catalyst, until carbon dioxide is evolved steadily. When a catalyst is used, the reaction occurs much faster than when a catalyst is not used. It has been found that if the reaction is carried out under partial vacuum conditions, the reaction is aided because of more rapid evolution of carbon dioxide.

As catalyst for the reaction any esterification or cross-esterification catalyst may be used. These may be acids or bases. Examples of acidic types are mineral acids such as sulfuric acid and some of its salts (such as sodium hydrogen sulfate), zinc chloride, ammonium chloride, naphthalene sulfonic acid or sulfonic acid type of ion-exchange resin ("Amberlite" IR–120(H), Rohm and Haas Co.). Examples of basic type catalysts are lead oxide and the oxides, carbonates or carboxylic acid salts of the alkaline earth metals such as sodium carbonate or bicarbonate, calcium hydroxide, magnesium oxide and high boiling tertiary amines such as quinoline. A basic ion exchange resin of the quaternary ammonium hydroxide type ("Amberlite" IRA–400(OH)) may also be employed satisfactorily.

Specific examples of the preparation of improved polyester materials in accordance with the principles of the present invention will now be given.

Example 1

A polyester (30 g.) made by heating adipic acid and dipropylene glycol and having an acid number of 49.5 and a hydroxyl number of 22.0 was heated with ethylene carbonate (2.34 g., which is substantially 100% of the theoretical stoichiometric amount calculated as set forth below for completely reacting with the carboxyl groups) to 190–220° C. in partial vacuum (100–200 mm. mercury) until evolution of carbon dioxide ceased. The product had an acid number of 19.0 and hydroxyl number of 51.7.

Example 2

A resin (115 g.) made from adipic acid and diethylene glycol and pentaerythritol and having an acid number of 20.7 and hydroxyl number of 21 was heated to 250° C. in vacuum with ethylene carbonate (10 g., which is substantially 268% of the theoretical stoichiometric amount for completely reacting with the carboxyl groups)

for 45 minutes. The product had an acid number of 0.5 and a hydroxyl number of 50.

*Example 3*

A polyester (47.5 g.) made by heating azelaic acid and diethylene glycol and having an acid number of 16 and a hydroxyl number of 36 was heated with 1.2 g. of ethylene carbonate (which is substantially 102% of the theoretical stoichiometric amount for completely reacting with the carboxyl groups) at 200–240° C. in vacuum until evolution of carbon dioxide ceased. The final product had an acid number of 12 and a hydroxyl number of 42.

*Example 4*

A polyester (40 g.) made by heating adipic acid, ethylene glycol and propylene glycol and having an acid number of 105 and a hydroxyl value of 30 was heated with ethylene carbonate (10 g.) and 0.05 g. sodium bicarbonate at 210–240° C. until carbon dioxide evolution had stopped. The final product had an acid number of 0.0 and a hydroxyl value of 88.2. Total reaction time was 1 hour with catalyst and 1½ hours without catalyst.

*Example 5*

A polyester (40 g.) made by heating adipic acid, ethylene glycol and propylene glycol and having an acid number of 105 and a hydroxyl value of 30 was heated with glycerol carbonate (10 g.) at 270–280° C. for 1½ hours. The final product had an acid number of 9.8 and a hydroxyl number of 95.

*Example 6*

A polyester (40 g.) made by heating adipic acid, ethylene glycol and propylene glycol and having an acid number of 105 and a hydroxyl value of 30 was heated for 1½ hours with 10 g. glycerol carbonate and 0.03 g. calcium hydroxide at 240–270° C. until carbon dioxide evolution had stopped. The final product had an acid number of 0.8 and a hydroxyl value of 80.8.

*Example 7*

A polyester (50 g.) made by heating fumaric acid, phthalic anhydride, triethylene glycol, ethylene glycol and propylene glycol and having an acid number of 91 and a hydroxyl value of 136 was heated with 15 g. of ethylene carbonate for ½ hour at 250–270° C. The final product had an acid number of 20.0 and a hydroxyl value of 157.6.

*Example 8*

The polyester (23 g.) employed in Example 7 was heated with ethylene carbonate (4.5 g.) and ammonium chloride (0.1 g.) to 210–265° C. Evolution of carbon dioxide ceased in 25 minutes, but, without catalyst, this took 45 minutes. The final product had an acid number of 1.8 and a hydroxyl number of 82.3. Without catalyst the values were 1.8 and 91.8 respectively.

Any alkylene carbonate may be used in the reaction although, because the reaction usually proceeds above 150° C., it is preferable to use those carbonates having a boiling point above this temperature.

In view of the uses to which polyester resins are usually put it is desirable to replace the carboxyl hydrogen atom by a hydroxyalkyl-group. In this way a reactive center is preserved. This may be readily attained if the carbonate is derived from a dihydric alcohol. Suitable carbonates in this class are those of ethylene, propylene glycol and 2,3-butylene glycol. If carbonates of trihydric alcohols such as glycerol or trimethylolethane are employed, each carboxyl group is replaced by a dihydroxyalkyl ester group. These carbonates are very useful.

The amount of carbonate or sulfite necessary to react with all or part of the carboxyl groups may readily be calculated. Thus the weight of such carbonate or sulfite necessary to react with all of the carboxyl groups of one gram of polyester is $$\frac{Ma}{56,000}$$

where $M$ is the molecular weight of the alkylene carbonate and $a$ is the acid number of the polyester. A slight excess (10–15%) may be desirable to ensure completion of reaction. Some excess of a carbonate of the ethylene glycol type is not detrimental since in time it will react with the hydroxyl groups resulting merely in lengthening the chain by adding hydroxyethyl units. Reaction with hydroxyl groups occurs much slower than with carboxyl groups. Too much excess carbonate is undesirable since it may act as a solvent or placticizer, unless it can be reacted completely as mentioned above. Reaction usually begins below 200° C. and is accelerated by the catalysts already mentioned. Basic catalysts are particularly desirable and useful since, unlike acidic catalysts, they do not encourage further condensation of the resin. Even so, at the temperatures employed, some condensation usually happens. This is evident from some of the examples already quoted, since, if no condensation had occured, the sum of the acid and hydroxyl numbers of a resin should be the same before and after treatment with a carbonate such as ethylene carbonate. Each carboxyl group which reacts is replaced by a hydroxyalkyl ester group. Catalyst in amounts of 0.01–1.0% have been found useful. Sodium carbonate is particularly satisfactory. It is seldom desirable or necessary to use temperatures in excess of 250° C.

What is claimed is:

1. A method which comprises reacting a polyester having a molecular weight of at least approximately 1000 and an acid number greater than about 16 and less than about 49.5, said polyester being predominantly the product of esterification reaction between an organic dicarboxylic acid selected from the group consisting of adipic, azelaic, fumaric, succinic, phthalic and terephthalic acids and a glycol selected from the group consisting of ethylene glycol, diethylene glycol, triethylene glycol, propylene glycol and dipropylene glycol, with an alkylene carbonate in an amount ranging from about 100% to 268% of the theoretical stoichiometric amount for completely reacting with the carboxyl groups of said polyester and at a temperature from approximately 200° C. to approximately 250° C. thereby effecting esterification of the carboxyl groups with formation of hydroxyalkyl ester groups, and continuing said reaction until the acid number of the polyester is reduced substantially below 16, said reaction being discontinued while limited substantially to said esterification.

2. A method according to claim 1 wherein said carbonate is selected from the group consisting of ethylene, propylene, 2,3-butylene and hydroxy ethylene carbonates.

3. A method according to claim 1 wherein said carbonate is ethylene carbonate.

4. A method according to claim 1 wherein said polyester is predominantly the product of reaction between organic dicarboxylic acid and glycol in the presence of a minor amount of an organic polyhydroxy compound containing more than two hydroxyl groups.

5. A method according to claim 1 wherein said polyester resin consists essentially of the reaction product between adipic acid and triethylene glycol in the presence of a minor amount of pentaerythritol.

References Cited in the file of this patent

UNITED STATES PATENTS

| | | |
|---|---|---|
| 1,845,198 | Schmidt et al. | Feb. 16, 1932 |
| 2,275,620 | Fuller | Mar. 10, 1942 |
| 2,386,446 | De Groote et al. | Oct. 9, 1945 |
| 2,448,767 | Carlson | Sept. 7, 1948 |